US008861064B2

(12) United States Patent (10) Patent No.: US 8,861,064 B2
Lamprecht et al. (45) Date of Patent: Oct. 14, 2014

(54) DEFORMABLE FERROFLUID LAYER DEVICES FOR OPTICAL MODULATION AND MICROMOLDING

(75) Inventors: Tobias P. Lamprecht, Berneck (CH); Thomas E. Morf, Gross (CH); Jonas R. Weiss, Hirzel (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/508,206

(22) PCT Filed: Nov. 8, 2010

(86) PCT No.: PCT/IB2010/055063
§ 371 (c)(1),
(2), (4) Date: May 4, 2012

(87) PCT Pub. No.: WO2011/055347
PCT Pub. Date: May 12, 2011

(65) Prior Publication Data
US 2012/0225252 A1    Sep. 6, 2012

(30) Foreign Application Priority Data

Nov. 6, 2009    (EP) .................................... 09175286

(51) Int. Cl.
*G02B 26/00*    (2006.01)
(52) U.S. Cl.
USPC .......................................... 359/290; 359/291
(58) Field of Classification Search
USPC .................................. 359/290, 291
See application file for complete search history.

(56) References Cited

U.S. PATENT DOCUMENTS

| 7,130,102 B2 | 10/2006 | Rabinowitz |
| 2004/0190000 A1* | 9/2004 | Thibault ...................... 356/512 |

(Continued)

FOREIGN PATENT DOCUMENTS

| EP | 1361585 A1 | 11/2003 |
| EP | 0 666 492 A2 | 4/2012 |

(Continued)

OTHER PUBLICATIONS

Frey, "SnOil—Ein plastisches Display basierend auf Ferrofluid", Feb. 23, 2008, XP002619671, retrieved from the Internet: URL:http//web.archive.org/web/20080223095335//http://www.freymartin.de/de/projekte/snoil [retrieved on Feb. 1, 2011] the whole document.

(Continued)

*Primary Examiner* — James Jones
(74) *Attorney, Agent, or Firm* — Scully, Scott, Murphy & Presser PC; Gail H. Zarick, Esq.

(57) ABSTRACT

The invention is directed to a device (10, 10a-10d) comprising: a set of on-chip circuits (110-160, 170, 180), each of the circuits configured to generate a magnetic field (300) perpendicular to a planar surface of the set when energized; a ferrofluidic layer (40) interfaced to the planar surface; and a logic circuit (50) configured to selectively energize (200, 200a) one ore more circuits of the set such as to generate a magnetic field at the energized circuits and a deformation (41, 44, 45) of the ferrofluidic layer in response thereto and to modulate optical beams (IR1, IR2) directed to the ferrofluid layer. Preferably, an additional liquid layer (60) is interfaced to the ferrofluid layer, opposite to the on-chip circuits, which is not miscible with the ferrofluid layer. The invention can be applied to micro-display/projection devices, programmable optical reflecting lenses, or to micro-molding applications for surface replication.

13 Claims, 6 Drawing Sheets

(56) References Cited

U.S. PATENT DOCUMENTS

2005/0200984 A1 9/2005 Browne et al.
2006/0215252 A1 9/2006 Moriyama et al.

FOREIGN PATENT DOCUMENTS

WO        2005027185 A2     3/2005
WO    WO 2005/027185 A2     3/2005

OTHER PUBLICATIONS

Cardot et al., "Fabrication of a magnetic transducer composed of a high-density array of microelectromagents with on-chip electronics", Sensors and Actuators A, Elsevier Sequoia S.A., Lausanne, CH, vol. 43, No. 1-3, May 1, 1994, pp. 11-16, XP026615703, ISSN: 0924-4247, DOI: DOI:10.1016/0924-4247(93)00652-K [retrieved on May 1, 1994] figure 4.
Cotter, et al., "Ferroelectric-liquid-crystal/silicon-integrated-circuit spatial light modulator", Optics Letters USA, vol. 15, No. 5, Mar. 1, 1990, pp. 291-293, XP002619670, ISSN: 0146-9592, the whole document.
Song et al., "Fabrication of Polyumeric 3-D Micro-Structures Using Ferrofluid Molds", Micro Electro Mechanical Systems, 2006, MEMS 2006 Istanbul, 19th IEEE Internaional Conference on Istanbul, Turkey Jan. 22-26, 2006, Piscataway, NJ, USA, IEEE, Jan. 22, 2006, pp. 334-337, XP010914250, DOI: DOI:IO.1109/MEMSYS.2006.1627804, ISBN: 978-0-7803-9475-9, Figure 3.
Cardot et al. "Fabrication of a magnetic transducer composed of a high-density array of microelectromagnets with on-chip electronics" Sensors and Actuators A, pp. 11-16, 1994.
Song et al."Fabrication of Polymeric 3-D Micro-Structures Using Ferrofluid Molds", MEMS 2006 Istanbul, Turkey Jan. 22-26, 2006.

\* cited by examiner

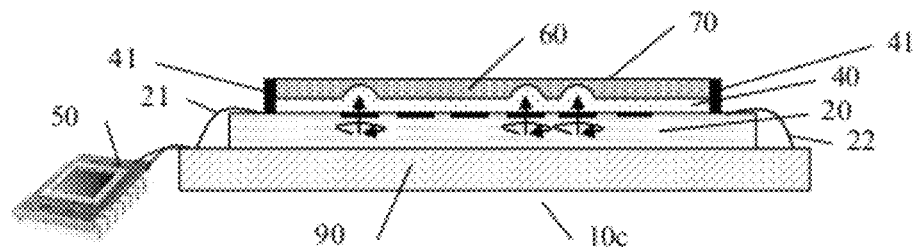
FIG. 8.A
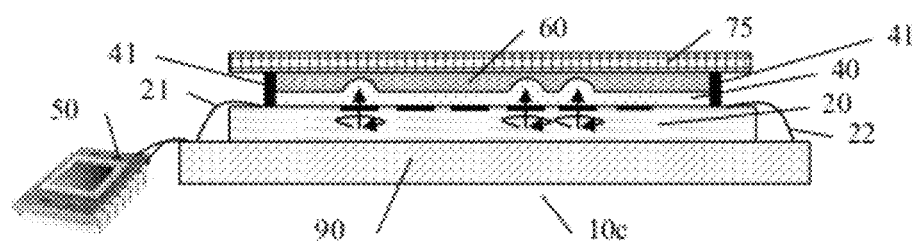
FIG. 8.B
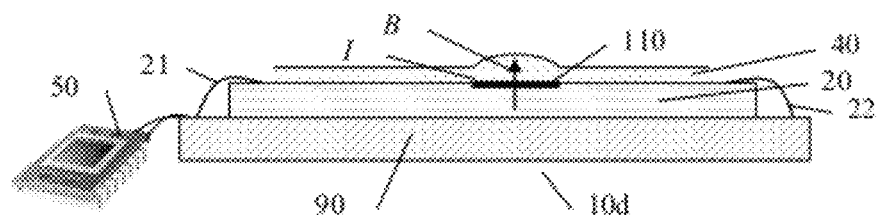
FIG. 8.C

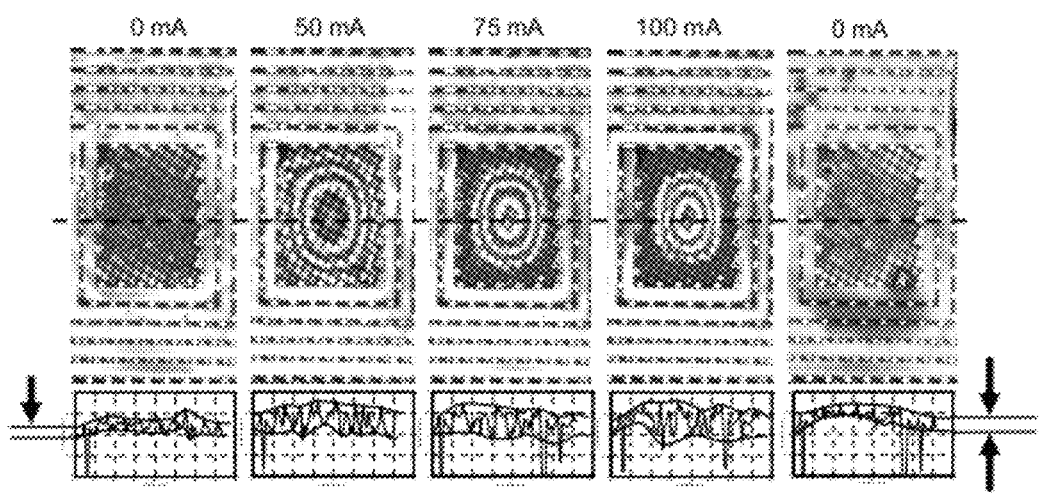
FIG. 9.A    FIG. 9.B.    FIG. 9.C.    FIG. 9.D.    FIG. 9.E.

DEFORMABLE FERROFLUID LAYER DEVICES FOR OPTICAL MODULATION AND MICROMOLDING

FIELD OF THE INVENTION

The invention relates to the fields of optical modulator and micromolding devices. In particular, it can be applied to micro-display/projection devices, programmable optical reflecting lenses, or to micro-molding applications for surface replication.

BACKGROUND OF THE INVENTION

The following patent documents provide details as to technologies relatable to the present invention:
- U.S. Pat. No. 7,130,102 discloses an apparatus comprising an array of rotatable planar mirrors and a means for producing a magnetic induction to individually rotate each of the rotatable planar mirrors. Further, this document discloses the feature of superimposing a layer of ferrofluid comprising rotatable planar mirrors, on a layer of transparent fluid.
- EP 0 666 492 discloses an apparatus comprising transparent plates and magnetic platelets suspended in a carrier fluid. The magnetic platelets are induced using a magnetic field source. Further, it is disclosed a method of applying a magnetic signal to an active material, the active material being ferromagnetic or paramagnetic particles dispersed in a carrier fluid.
- US 2005/0200984 discloses a method of applying a magnetic signal in order to change the shape of the substrate in a mirror assembly used in optical or imaging instrumentation; and
- US 2006/0215252 discloses an apparatus comprising a layer of fine mobile particles, the fine mobile particles changed by external stimulus such as a magnetic field. It further discloses a layer of fine mobile particles as a colloidal solution with ferromagnetic fine particles dispersed.

Next, in addition to patent literature, it is pointed at the following online materials:
- [1] Replicated micro optics: http://www.heptagon.fi/downloads/0431107%20OptEng_RudmannRossi_NOV-04.pdf
- [2] UV-embossing: http://www.polymicro-cc.com/site/pdf/POLYMICRO-tech_UV-embossing.pdf
- [3] Ferrofluidic Display "SnOil": http://www.freymartin.de/en/projects/snoil and http://www.youtube.com/watch?v=uAO5dTBMDkY.

Interestingly, the so-called SnOil system makes use of the ferrofluid magnetic sensitivity to selectively form bumps in a ferrofluid layer and thereby achieve a ferrofluidic display: the system is applied to a classic arcade game. It comprises a basin filled with a layer of ferrofluidic oil. Directly underneath is a grid of 12 by 12 electromagnets that are arranged closely to each other, in four blocks with 36 pieces each. The electronics for triggering the separate magnets are located on several layers of printed circuit boards directly underneath the layer of magnets. By selectively energizing the magnets, a corresponding magnetic field is activated, resulting in 144 individually selectable "fluid-bumps".

BRIEF SUMMARY OF THE INVENTION

According to one aspect, the present invention is embodied as a device comprising: a set of on-chip circuits, each of the circuits configured to generate a magnetic field perpendicular to a planar surface of the set when energized; a ferrofluidic layer interfaced to the planar surface; and a logic circuit configured to selectively energize one ore more circuits of the set such as to: generate a magnetic field at the energized circuits; cause a deformation of the ferrofluidic layer in response thereto; and modulate optical beams directed to the ferrofluid layer.

In embodiments, the device may comprise one or more of the following features:
- the on-chip circuits are each constructed as a CMOS circuit;
- the device of the invention further comprises an additional liquid layer interfaced to the ferrofluid layer, opposite to the on-chip circuits, the additional liquid layer not miscible with the ferrofluid layer;
- the additional liquid layer is a transparent buffer liquid layer or a mold-film;
- the device further comprises a cover layer covering any other layer in the device, opposite to the on-chip circuits;
- the device further comprises one or more separator layer interfaced to any layer in the device; and
- the device is further configured to capture and redirect optical beams reflected from given portions of the ferrofluid layer.

According to another aspect, the present invention is further embodied as a micro-display and/or projection device, the latter comprising the above device, configured to capture and redirect optical beams reflected from given portions of the ferrofluid layer.

In a variant to one of the above devices, the logic circuit is configured to dynamically energize one or more of the circuits.

According to still another aspect, a device according to the invention is further embodied as a programmable optical reflecting lens.

According to yet another aspect, the present invention is embodied as a method of molding, comprising the steps of: providing a device according to the invention, the device comprising at least one liquid layer deformable upon energizing the on-chip circuits which is curable; energizing the on-chip circuits such as to obtain a desired pattern of deformations in the ferrofluid layer; molding the curable layer by curing it while the ferrofluid layer is being deformed; and removing the cured layer.

In an embodiment, the curable layer provided with the device is interfaced to the ferrofluid layer, opposite to the on-chip circuits, the curable layer being preferably a mold-film, usable for surface replication.

In another embodiment, the device provided further comprises a release layer interfaced to the curable layer such as to ease the removing of the cured layer.

In yet another embodiment, the method further comprises the steps of: providing another curable layer interfaced to the ferrofluid layer; and repeating the steps of energizing and molding the other curable layer and removing the cured layer.

Finally, according to another aspect, the invention is embodied as a cured material, molded according to the method of the invention.

An optical modulator device, related devices, a molding method and a cured material embodying the present invention will now be described, by way of non-limiting examples, and in reference to the accompanying drawings.

BRIEF DESCRIPTION OF SEVERAL VIEWS OF THE DRAWINGS

FIGS. 8.A-C show other embodiments of modulator devices, according to the invention;

FIGS. 9.A-E shows experimental results obtained with the device of FIG. 8.C.

DETAILED DESCRIPTION OF THE INVENTION

As an introduction to the following description, it is first pointed at general aspects of the invention, directed to an optical modulator device. The device comprises planar on-chip circuits (or OCCs). Each of the OCCs is configured such as to induce a magnetic field perpendicularly to its planar surface upon energizing. Typically, the circuits at stake are on-chip coil circuits, obtained according to a CMOS process. Next, a ferrofluidic layer is interfaced to the OCCs such that selectively energizing the circuits generate a magnetic field which in turn allows for locally deforming the ferrofluidic layer. An optical beam directed to the layer can accordingly be modulated. Such a configuration of circuits allows for high integration and is thus suited for micro optics applications. The level of integration enabled by the OCCs allows in turn for manufacturing low-cost optics devices.

Figure 1:
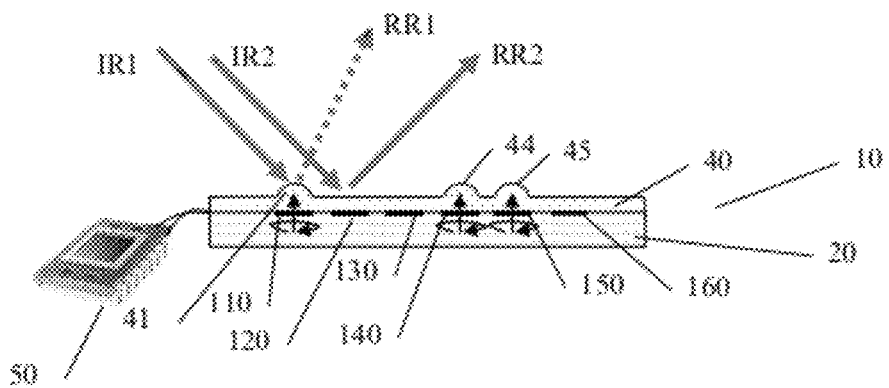
FIG. 1 depicts a basic principle at the core of the invention, in a device according to an embodiment.

FIG. 1 schematically illustrates the basic principle at the core of the invention. It shows a section view of an optical modulator device 10, which comprises a set of planar OCCs 110-160. The whole chip is denoted by reference numeral 20. As said, the circuits are each configured to generate a perpendicular magnetic field when energized, as represented in the figure (that is, the magnetic field generated has a perpendicular component). For the sake of illustration, the magnetic fields generated are symbolically depicted by vertical arrows. Energizing the OCCs is instead represented by circular arrows.

The device further comprises a ferrofluidic layer 40 interfaced to the on-chip circuits. As known, a ferrofluid is usually a colloidal mixture comprising nanoscale ferromagnetic (or ferrimagnetic) particles suspended in Brownian motion in a carrier fluid, e.g. an organic solvent or water. The nanoparticles are preferably coated with a surfactant to prevent their agglomeration (due to van der Waals and/or magnetic interactions).

The present ferrofluid layer may comprise particles with diameters of e.g. 10 nanometers or less, such as particles of magnetite, hematite or other compound of iron. As any ferrofluid, the layer 40 does not retain magnetization in the absence of applied field but instead exhibits large-scale paramagnetism.

The device further comprises a logic circuit 50, e.g. suitably connected to the OCCs. The logic circuit can be a remote processing unit, e.g. in a remote laptop, or may be provided on the same chip. It is nevertheless configured to selectively energize the OCCs, and preferably dynamically (the spatial energization scheme is a function of time). This locally induces magnetic fields and generates in turn deformations 41, 44, 45 in the ferrofluidic layer. Accordingly, optical beams IR1, IR2 directed to the layer 40 can be modulated: the reflected beams RR1, RR2 have distinct orientations.

Figure 2:
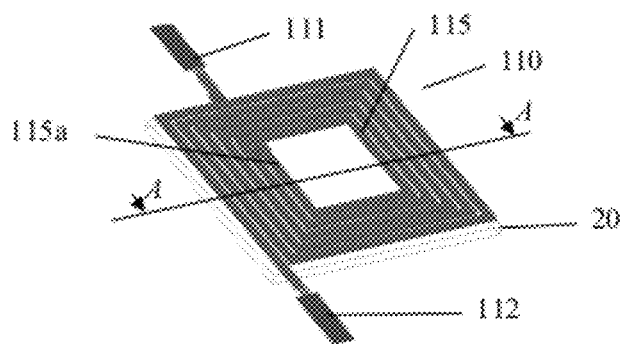
FIG. 2 is an example of on-chip circuit that can be used in an embodiment of the present invention.

Next, in reference to FIG. 2, an example of on-chip circuit 110 is depicted, as used in an embodiment of the invention. The OCC 110 may for instance consist of an on-chip inductor on a CMOS chip 20 (for complementary metal-oxide-semiconductor). The OCC is energized by letting electric current flow from one port 111 to the other 112, which shall induce a magnetic field. The depicted OCC 110 has a planar coil shape, which advantageously concentrate the magnetic field at the center. More exactly, it is shaped as a square, multiple-turn wire coil, giving rise to opposite strands, e.g. strands 115, 115a. The length of the strands may vary between e.g. 60 and 120 micrometers (or μm), and their width is typically less than 10 μm.

Many such coils can be suitably interconnected in order to be energized from the logic circuit previously described; the on-chip circuits are preferably constructed each as a CMOS circuit, such as to form a single CMOS chip. Else, chips can be assembled such as to form an array of coils. In variants, other processes suitable for obtaining a planar circuitry can be relied upon. CMOS processes are known per se.

Obviously, other (intermediate) electronic components might be involved in order to feed the OCC with the appropriate power needed for the desired magnitude of the magnetic field. The latter depends also on the characteristics of the ferrofluid used and the application sought. Fine tuning of these characteristics may be obtained as a trial-and-error process or by simulation.

Sophisticated variants can be contemplated. For instance, the shape of the ferrofluid bumps caused by energizing the circuits can be fine-tuned by means of a scheme wherein multiple coils per "pixel" are used and/or by pulse-modulating the currents energizing the coils. Moreover, exciting the ferrofluid with high frequency magnetic pulses may allows for reducing the feature size owing to harmonic standing waves occurring between the "pixels".

Figure 3:
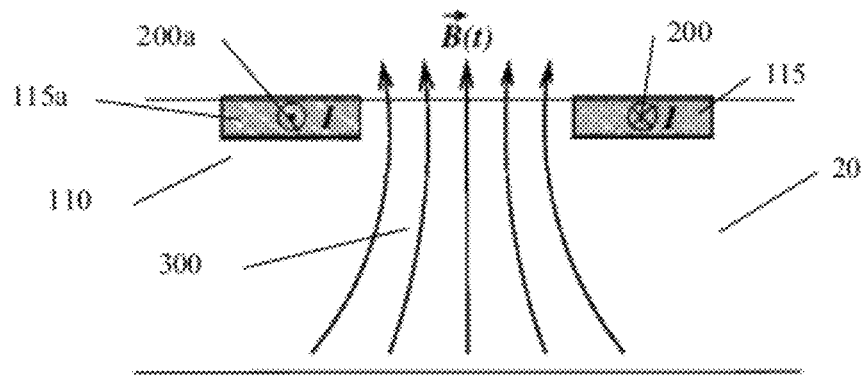
FIG. 3 illustrates the induction of a magnetic field by switching the flow of an electric current in the circuit of FIG. 2.

FIG. 3 is a cross-section view of FIG. 2, at the level of the line AA in FIG. 2 and according to the direction indicated therein. The electron flow (−I) circulates as indicated in the FIG. 200a, 200, bound to the conductor strands 115a, 115 of the inductor 110. Only two brands are represented in section, for simplicity. According to electromagnetism laws, a magnetic field B is generated by the flowing electric current. The vector field B notably depends on the magnitude, direction, length, and proximity of the electric current. The magnitude of B is maximum at the center of the coil. Thus, the coil is preferably configured having only a CMOS-passivation layer between the coil and the ferrofluid.

Reverting briefly to FIG. 1, the ferrofluid layer shall respond to the induced magnetic field, giving rise to a (polarization independent) vertical displacement (e.g. 1-2 μm). Accordingly, applying a current to the coil generates a magnetic field which in turn deforms the ferrofluid layer.

Next, FIG. 4 relates to another embodiment of the optical modulator device, wherein a buffer liquid layer 60, preferably transparent, or a curable layer (as to be discussed later) is interfaced with the ferrofluid, opposite to the on-chip circuits. The buffer layer enables well-defined, optionally transparent interfaces. More generally, adjusting the desired optical or molding properties is more suitably achieved through this additional liquid layer, which simply follows the deformations of the ferrofluid layer, rather than from the ferrofluid layer itself Typical thicknesses vary between 1/10 and 1/1 of the diameter of the coil. Therefore, an additional layer is advantageously provided on top of the ferrofluid layer, non miscible with the latter. Various such liquid materials can be contemplated. Surface tension and polarity of the layers are tuned such that liduids are not miscible.

Preferably, a cover layer 70 is advantageously provided on top of the buffer layer, which covers the buffer layer 60 or any other layers in the device. This allows to protect the buffer layer and define a clean surface.

In addition, if the surface tensions of the layers involved do not enable convenient interfaces, the device may further comprise one or more separator layers 80, 80*a*, interfaced between two contiguous layers. In the example of FIG. 4, such a separator layer is provided between the ferrofluid and the buffer. An additional layer 80*a* may further be provided between the CMOS chip and the ferrofluid. A separator layer can be contemplated to e.g. help in improving reflectivity and/or dynamic response, enabling a clean interface or in releasing subsequent layers. For example, the layer 80 may be a release layer, in the case of molding applications, as to be discussed later.

Figure 4:
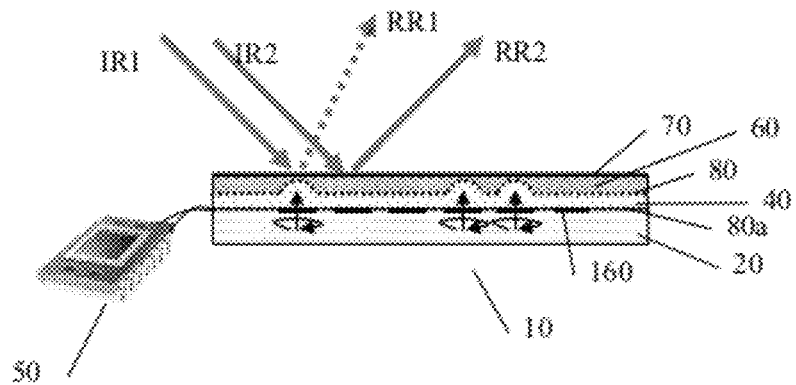
FIG. 4 relates to another embodiment of a modulator device.
Figure 5:
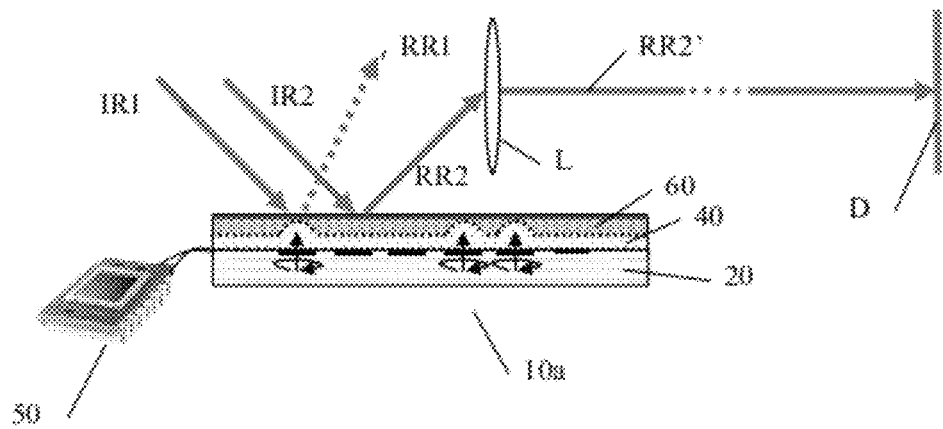
FIG. 5 exemplifies application of the device of FIG. 4 to optical projection.

FIG. 5 exemplifies the use of a device as in FIG. 4 in a micro-display/projection device. Basically here, the device is augmented with means for capturing and redirecting reflected optical beams, for example towards a display device D. A lens L might for instance be used to redirect optical beams RR2 reflected from the non-deformed portions of the ferrofluid layer. As a note, similar configurations can be contemplated for other purposes than display.

Figure 6:
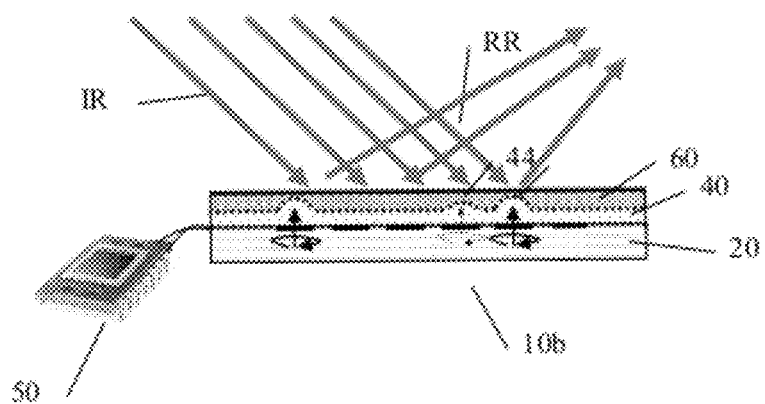
FIGS. 6 and 7 illustrate a device as in FIG. 4 used for application to a programmable lens.
Figure 7:
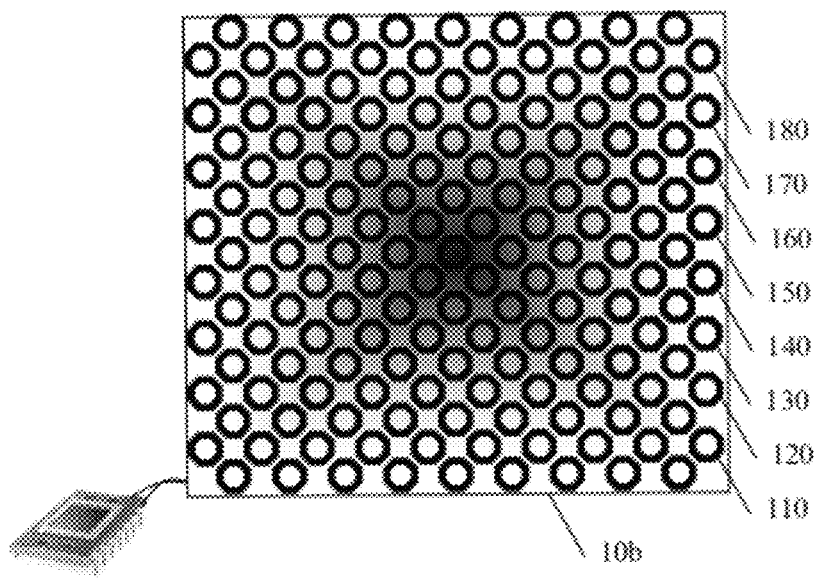

Other applications are in order. One is to programmable lenses, as illustrated in FIGS. 6 and 7. Here a device as in FIG. 4 is used (see FIG. 6). As shall become apparent to the one skilled in optics, deformations of the ferrofluid can be programmed such as to obtain a reflecting lens with a given shape, i.e. a programmable lens. FIG. 6 illustrates a device as in FIG. 4 where incident light rays IR are reflected (RR) according to the shaped interface 40-60, suitably programmed via a logic 50.

As known, a fraction of the light is reflected from the interface while the remainder is refracted. Thus, the compositions of the ferrofluid and the buffer layer might be tuned in order to minimize the refraction, if needed. Assuming that the non-deformed reflecting surface is very smooth, the reflection taking place there is specular. The angles that incident and reflected rays make with the normal are equal, in contrast with the diffuse reflection occurring in the deformed surface portion 44, 45. In addition, the magnitude of the magnetic field can be varied, and so the magnitude of deformations (see the bumps 44 and 45). Suitably programming the currents feeding the circuits results in that a concavity, a convexity or more complex patterns can be obtained.

FIG. 7 exemplifies a top view of a sample surface of such a programmable lens 10*b*, wherein an arrangement of coils is visible (e.g. reference numerals 110-180). Furthermore, a density plot shows the values of the deformation, i.e. a function of two variables x, y at a regular array of points. Lighter regions are the most deformed (and hence the highest) parts of the surface. Specular reflection occurs in the darkest parts of the surface.

Two main applications have been described so far (projection and lenses). In this respect, additional comments are in order. First, concerning more specifically the display applications:

Because the pixel-size is a function of the coil-size (which can be smaller than 10 μm) and the particle size of the ferrofluid (typically a few nanometers), extremely small pixels can be manufactured, which are "continuously" adjustable in height. Therefore a device such as described above is well suited for micro-/portable projectors, as discussed above.

Virtually 100% fill factor of the optical surface can be achieved, because the electronic is completely covered by the ferrofluid and / or the reflecting layer.

Color can be added to the projection through the use of a standard color wheel or through the use of multiple modulator chips.

Next concerning more specifically applications to lenses:

A programmable lens as described above allows for various applications, such as Fresnel type of lens, programmable corrections of manufacturing tolerances/errors.

A given lens shape can further be frozen by adding e.g. UV or thermal curing polymer in either the ferrofluid or the buffer liquid, see below.

With an appropriate selection of the buffer liquid a freezing can be achieved during normal operation temperature. Melting would then be needed to re-program the shape of the lens. This can be achieved by increasing the current through the coils to high levels, i.e. a higher level than required to program the lens. This is in particular of interest for low power applications, if a specific optical modulation is required for a certain time, e.g.,display applications for advertisement or displays for reading a text.

A row and column addressing system with e.g. three bit resolution allows to generate arbitrary magnetic field distribution across the chip. This in turn generates an arbitrary shaped lens.

Finally, concerning any type of applications:

The size of the device is merely limited by the size of the CMOS wafer. One can assume large masks or patterns which continue on neighboring reticle, else typical sizes of 2.5 cm×2.5 cm are readily available and operational.

Gravitational dependency of the layers , can however be eliminated by dynamic compensation using a feedback loop and by engineering the surface tension and density of the various layers.

Requirements at the CMOS process are uncritical. No deep submicron processes are needed. However, multiple metal layers may be useful, to enable multi-layer, multi-turn spiral inductors to maximize the magnetic filed strength. Spiral inductors could be drawn e.g. as squares (see FIG. 2) or hexagons.

Magnetic coupling between coils, if any, can be compensated with suitable algorithms for reshaping the total magnetic field distribution.

The fluid stack can be applied to the chip as a whole (sandwich), including sealing studs and cover-window on the wafer-level.

At a given supply voltage, using current-reuse in the CMOS drive-circuits, the total power-consumption can be kept low while attaining large magnetic fields.

Additional fluid or non-fluid layers (i.e. separator layer) help in improving reflectivity and/or dynamic response, obtaining clean interfaces or enabling the release of one or more layers, as evoked earlier.

Next, FIGS. 8.A-C relate to further variants of optical modulator devices, according to embodiments of the invention. In each of FIG. 8.A or 8.B, a suitable enclosure 41 such as a sealing lip 41 (viewed in section) is provided, which encloses successive layers 40, 60 of the device 20-70 as described in reference to FIG. 1 or 4. The CMOS chip 20 resides on a package laminate 90; numeral references 21, 22 denote bond wires. On top of the lip is e.g. a cover layer 70 or a sealing cover 75 (respectively in FIG. 8.A or 8.B). The sealing cover can be a single window, or still a mold substrate, as to be discussed next. The enclosure can for instance be manufactured after standard CMOS processing on the wafer-level (array of dies or individual dies), as can the fluids be applied. The wafer-level processability and the compatibility with standard CMOS technology are an inherent price-advantage with respect to known technologies.

In FIG. 8.C, only one coil 10 is provided, be it for experimental purpose. In this respect, it was applied a thin film (~500 nanometers) of ferrofluid layer 40 onto a CMOS chip 20 with inductors within the back end of line (BEOL), i.e. the portion of integrated circuit fabrication line where the active components (transistors, resistors, etc.) are interconnected with wiring on the wafer 21, 22. The BEOL used was here originally designed and optimized for inductive peaking.

By applying a current I through the coil 110, a magnetic field B is induced, resulting in a vertical displacement of the fluid in the order of 1-2 μm.

In this respect, FIGS. 9.A-E illustrate the experimental results (optical interferometry measurements of surface height at different currents) obtained with the device of FIG. 8.C. More in details, interferrometric contour lines of the magnetically induced fluid bump are shown as a function of the current applied (0 to 100 mA). The pictures show an on-chip coil, a side of which is approximately 120 μm long, and which is visible in transparency under the ferrofluid applied. At the center of the coil, contour lines are visible in some cases (50-100 mA). The higher the current, the closer the contour lines are, hence the more pronounced the peak is. For control purpose, a second 0-current measurement was performed (last picture on the right), which demonstrates the reversibility of the process. The pictures are supported by graphs showing the fluid offset from the chip, i.e. the static offset plus the offset magnetically induced. As can be seen, the offset remains substantially the same before the and after measurements. Note that measurements are noisy due to the small thickness and thus the high transparency of the ferrofluid film used. This is however for the sake of illustration only as the ferrofluid layer does not need to be transparent.

Next, according to another aspect, the invention is further directed to a molding method. FIGS. 10-14 illustrate steps of such a method, according to a specific embodiment.

In reference to these figures, the method first comprises providing an optical modulator device as in FIG. 8.A or 8.B, see step S10, FIG. 9. However, the device only contains a ferrofluid layer 40 so far.

Figure 10:
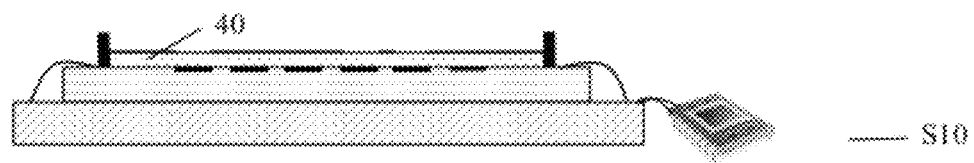
FIGS. 10-14 illustrate steps of a molding method using a device as in FIG. 8.A or 8.B, according to an embodiment of the present invention.

A curable liquid material layer 60 (e.g. a mold-film) is then interfaced to the ferrofluid layer 40, opposite to the on-chip circuits. Basically, the enclosure of the device is filled (step S12) with the curable material, on top of the ferrofluid layer. The layers are not miscible, to maintain a clean interface (FIG. 10).

Figure 11:
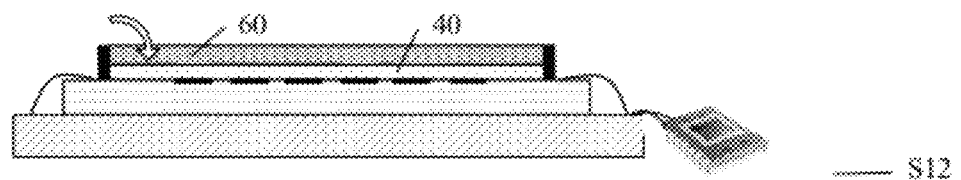
Figure 12:
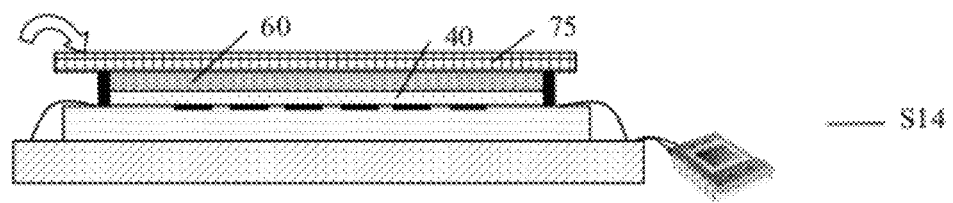
Figure 13:
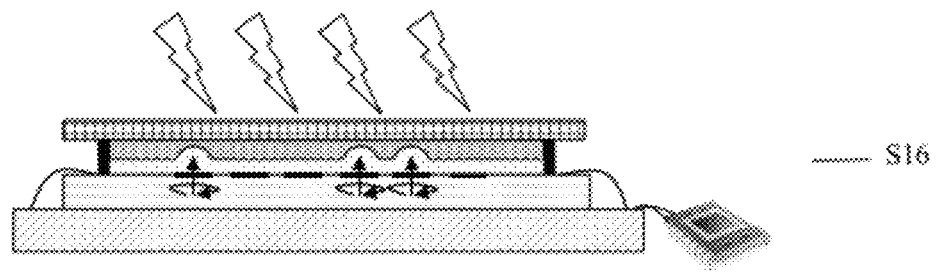
Figure 14:
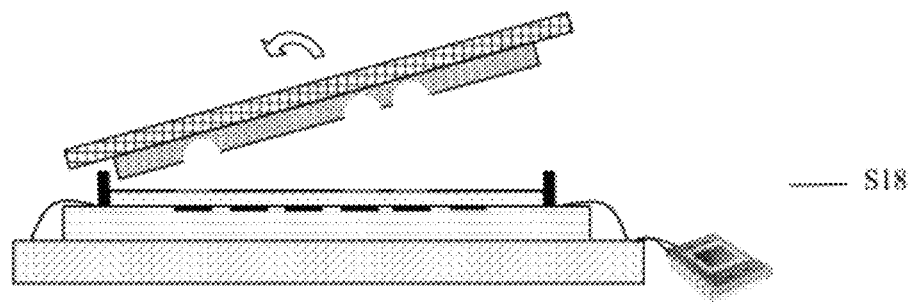

Preferably, an on-top cover 75 is added, such as to seal the layer from above and get a clean interface, step S14 (FIG. 11). The cover 75 can be used as a substrate for the layer or film to be molded next.

Then, the method comprises a step of energizing (step S16, FIG. 12) the on-chip circuits such as to obtain a desired pattern of deformations in the ferrofluid layer, as discussed earlier. A variable magnetic field applied to a ferrofluid film leads to local, variable accumulation of the contained nanoparticles; the surface hence becomes a function of the magnetic field applied. As said, using many tiny, variable/dynamic magnetic field generators (i.e. CMOS on-chip coils), an arbitrary magnetic field can be created which then can generate complex shapes in the ferrofluid film, suitable for many micro-mold applications (e.g. micro-lenses, etc.). Incidentally, the shape of the ferrofluid layer is likely smoothed by the surface tension of the ferrofluid, thus, preventing sharp edges but enabling smooth surfaces, i.e. ideal for lenses.

Concomitantly, the curable layer is cured (step S16), using e.g. light- or heat-induced curing, as known per se. The ferrofluid layer is still being deformed as the top layer is being cured. Note that the sealing cover is suitably chosen, such that curing the curable layer with e.g. UV light can occur through the cover layer, if necessary.

Finally, the cured layer can be removed, possibly together with the sealing cover 75 (step S18). After curing, the cured layer can be removed, such that the "original" ferrofluid can be reused and reprogrammed for new molds.

The cured layer reflects the pattern of ferrofluidic deformations, such that a fine bump-shaped pixellization can be visible. A cured layer, molded as described above is according to the invention too.

In a variant, this is the ferrofluid layer itself which is curable, such that no additional curable material is needed. Such an option is however more difficult to implement as the composition of the layer 40 needs to ensure that the liquid layer 40 be both ferrofluidic and curable. When the ferrofluid composition is modified in such a way that it can be hardened/cured; it therefore conserves the once programmed shape. After releasing the cured ferrofluid layer, it acts directly as mold. The CMOS-chip can nevertheless be reused to fabricate further molds.

According to another variant, the device further comprises a release layer (such as layer 80 or 80*a* in FIG. 4) interfaced with the curable layer such as to ease the removing of the cured layer. When a mold-film is used on top of the ferrofluid layer, the mold-film adapts to the shape of the ferrofluid film and separation layer. It can then be cured and easily released in order to be used as micro-mold for surface replication. The separation layer, which can be solid or liquid, separates the ferrofluid film from the mold-film, and might also enable a simpler release of the mold-film.

While the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiment disclosed, but that the present invention will include all embodiments falling within the scope of the appended claims. For instance, various compositions can be contemplated for the ferrofluid layer. In particular, for applications to morphing mirrors, one may suspend magnetic iron particles in an automotive antifreeze, which can support a reflective film and is stable, creating an optical-quality surface.

The invention claimed is:

1. A device comprising:
    a semiconductor chip;
    a set of on-chip circuits in the semiconductor chip, each of the circuits configured to generate a magnetic field perpendicular to a planar surface of the set when energized;
    a ferrofluidic layer on the semiconductor chip and interfaced to the planar surface; and
    a logic circuit configured to selectively energize one or more circuits of the set such as to:
        generate a magnetic field at the energized circuits;
        cause a deformation of the ferrofluidic layer in response thereto; and
        modulate optical beams directed to the ferrofluidic layer.

2. The device of claim 1, wherein the on-chip circuits are each constructed as a CMOS circuit.

3. The device of claim 1, further comprising an additional curable liquid layer interfaced to the ferrofluidic layer, opposite to the on-chip circuits, the additional liquid layer not miscible with the ferrofluidic layer and following deformations of the ferrofluidic layer.

4. The device of claim 3, wherein the additional liquid layer is a transparent buffer liquid layer or a mold-film.

5. The device of claim 1, further comprising a cover layer covering any other layer in the device, opposite to the on-chip circuits.

6. The device of claim 1, further comprising one or more separator layer interfaced to any layer in the device.

7. The device of claim 1, further configured (L) to capture and redirect optical beams (RR2) reflected from given portions of the ferrofluid layer.

8. A micro-display and/or projection device, comprising the device of claim 7.

9. The device of claim 1, wherein the logic circuit is configured to dynamically energize one or more of the circuits.

10. The device of claim 1, configured as a programmable optical reflecting lens.

11. The device according to claim 1, wherein the set of on-chip circuits are spaced apart from each other and form an array of circuits in the semiconductor chip.

12. The device according to claim 11, wherein:
each of the on-chip circuits forms a respective center; and
the magnetic field generated at each of the on-chip circuits is concentrated at the center of said each on-chip circuit.

13. The device according to claim 1, wherein the logic circuit energizes each of the circuits of the set of on-chip circuits individually to enable arbitrary magnetic field distributions across the semiconductor chip.

* * * * *